Nov. 9, 1943.   F. C. PERKINS   2,334,123
METHOD AND APPARATUS FOR SEALING GLASS ENVELOPES
Filed March 13, 1942
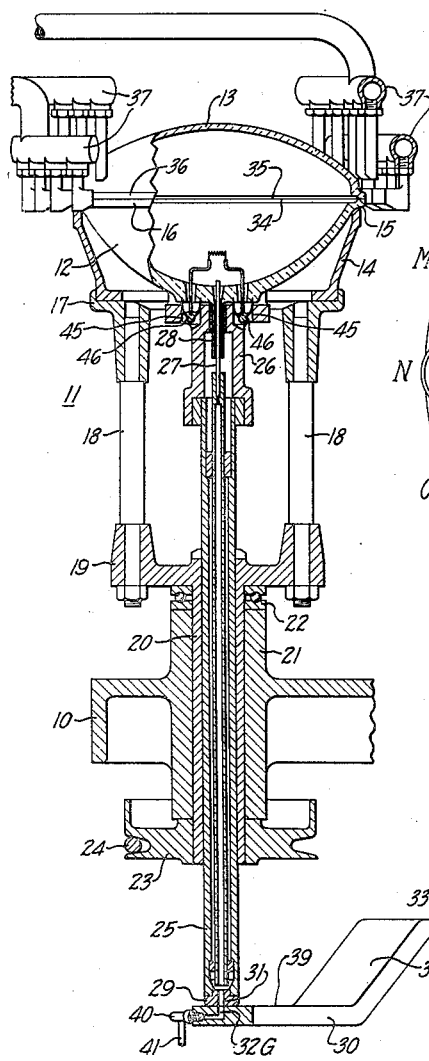
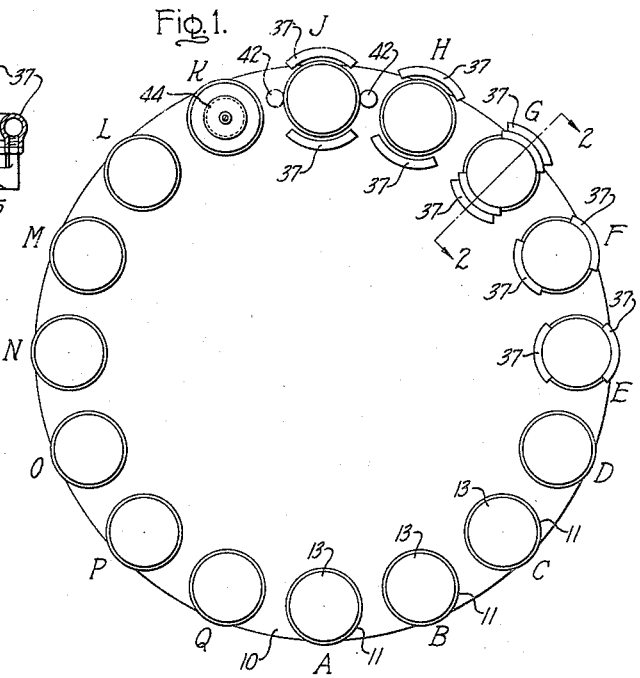
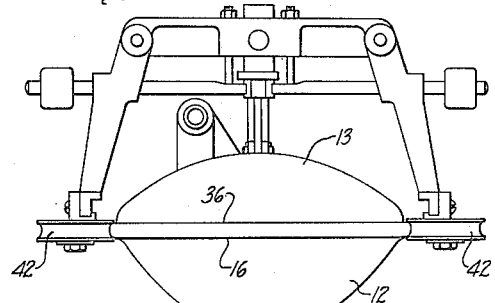
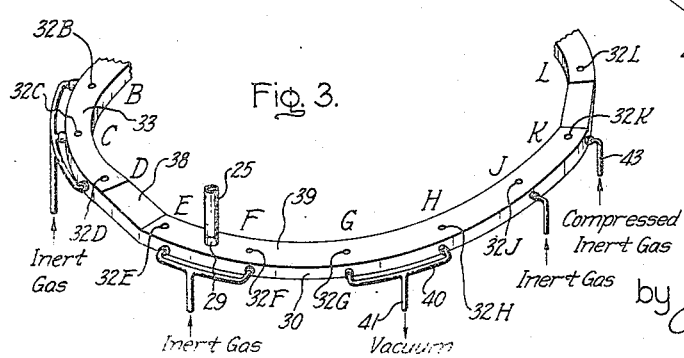
Inventor:
Frank C. Perkins,
by John H. Anderson
His Attorney.

Patented Nov. 9, 1943

2,334,123

UNITED STATES PATENT OFFICE 2,334,123

METHOD AND APPARATUS FOR SEALING GLASS ENVELOPES

Frank C. Perkins, Warren, Ohio, assignor to General Electric Company, a corporation of New York Application March 13, 1942, Serial No. 434,615

11 Claims. (Cl. 176—3)

My invention relates in general to method and apparatus for sealing together vitreous members or bodies, and more particularly to method and apparatus for sealing together vitreous members or bodies forming an enclosure for an electric incandescent lamp or the like. Still more particularly, my invention relates to method and apparatus for sealing by fusion the preformed glass reflector and cover glass sections forming the enclosure or bulb of a lamp of the type disclosed in United States Patent 2,148,314, issued February 21, 1939, to D. K. Wright and assigned to the assignee of the present invention.

Electric lamps of the type disclosed in the above mentioned Wright patent comprise a pressed reflector section which supports a filament or other light source and has a very definite interior optical shape, usually parabolic, with a reflecting coating thereon adapted to redirect the light from the filament in a definite manner. Over the mouth of the reflector section, which has the general form of a cup and constitutes one portion of the lamp bulb, is sealed another pressed glass cover or lens section constituting the other portion of the bulb and usually provided with light-refracting media or panels for concentrating or diffusing the light in a definite manner. The sealing together of the two glass sections is effected at their peripheral edges which are provided, for this purpose, with co-operating annular sealing surfaces.

The method heretofore employed for sealing together the cover glass and reflector sections of such lamps has been to place the cover glass on top the reflector section with the co-operating annular sealing surfaces in interengagement and with the cover glass resting on the reflector section by gravity alone, then heating the adjoining edges and sealing surfaces of the two glass sections to a plastic condition so as to fuse together, and finally rolling the edges of the glass sections to form or shape the said edges and then raising the cover glass a slight amount to thereby stretch the seal so as to partly remove the strains therefrom. With such procedure, however, warpage in the glass prevented the sealing surfaces from assuming, in all cases, the intimate contact necessary to form a complete seal across the entire width or lateral extent of the sealing surfaces, the weight of the cover glass being the only force applied to secure this intimate contact across the entire width of the sealing surfaces. In such cases, the finished seal possessed little, if any, strength, and would be quite apt to break or fracture.

One object of my invention is to provide an improved method of sealing two glass bodies together by fusion to form a seal therebetween of relatively high strength.

Another object of my invention is to provide apparatus for automatically sealing two glass sections together by fusion at a relatively high rate of speed while producing a seal of relatively high strength.

A feature of the invention is the production of a vacuum within the enclosure formed by the cover glass and reflector sections, as soon as the glass at the sealing surfaces of such sections is heated to a plastic condition, to thereby pull or draw the two glass sections together tightly, thereby insuring the intimate contact across the entire width of the sealing surfaces which is essential to a strong seal between the glass sections.

Further objects and advantages of my invention will appear from the following description of a species thereof and from the accompanying drawing in which:

Fig. 1 is a diagrammatic plan view of a sealing machine comprising my invention; Fig. 2 is a vertical section through the turret of the machine on the line 2—2 of Fig. 1; Fig. 3 is a fragmentary perspective view of the cam track of the machine comprising my invention; and Fig. 4 is a fragmentary side elevation of the seal reshaping means of the machine comprising my invention.

Referring to the drawing, the apparatus there shown is similar to that described and claimed in United States Patent 2,237,186, issued April 1, 1941 to F. J. Malloy, and comprises a turret or carrier 10 provided with a plurality of rotatable heads 11 for supporting and carrying, in an upright position, the glass reflector sections or bodies 12 which are to be individually sealed to a cover glass section or body 13 to form the envelope or bulb of the lamp. Each head comprises a main ring-shaped holder 14 (Fig. 2) which is arranged to engage the annular under surface 15 of the periphery or rim 16 of the reflector section 12 to thereby support the latter. The holder 14 is mounted on an upper bracket 17 supported by standards or posts 18 extending upwardly from a lower bracket 19 having a depending sleeve 20. The said sleeve 20 extends through and is rotatably mounted in a bearing 21 on the turret 10, a ball bearing 22 being interposed between the under surface of the bracket 19 and the upper end of the turret bearing 21 to thereby support, and permit free and easy rotation of the head 11 on the turret. Rotation of the entire head 11 is effected, at each station around the machine except the loading and unloading stations A and Q, by means of a pulley 23 fastened to the lower end of sleeve 20 and engaged by a moving belt 24.

Extending through and vertically movable in the sleeve 20, but locked thereto so as to rotate as a unit with the sleeve, in a hollow spindle 25. At its upper end, the spindle 25 is provided with a secondary support or holder 26 for the reflector section 12, said holder having openings 45 which receive thimbles 46 on the reflector section. Engagement of the thimbles 46 with said openings 45 positively prevents relative rotation between the holder 26 and the reflector section 12. The holder 26 is also provided with a metal tube 27 which is arranged to extend through the slightly larger exhaust tube 28 on the reflector section into the interior of said reflector section when the latter is properly supported in position on the secondary holder 26. The metal tube 27 communicates with the hollow interior of the spindle 25 which is closed at its upper end except for the passageway through the said metal tube. At its lower end, the spindle 25 is provided with a shoe 29 which, during rotation of the turret 10 and consequent movement of the spindle in a circular path around the machine, rides on the upper surface of a cam track 30 extending circularly around the machine and supported from a stationary part of the machine. The shoe 29 is provided with an opening 31 extending therethrough from its under surface and communicating with the hollow interior of the spindle 25. When the head 11 is positioned at different stations around the machine, the opening 31 in the shoe aligns with different ports 32B, 32C, 32D, etc. in the cam track 30 at such stations, different ones of said ports being connected to a source of inert or reducing gas for flushing purposes, to a source of vacuum, or to a source of inert or reducing gas under pressure, depending upon the particular operation which is to take place at each station.

At the first or loading station A of the machine, a reflector section 12 is properly mounted and locked in the secondary holder 26 so as to rotate therewith, the said holder being in an elevated position relative to the ring-shaped main holder 14 because of the engagement of the shoe 29 at the lower end of spindle 25 with an elevated portion 33 of the cam track 30. A cover glass section 13 is then placed on top of the reflector section 12 in proper position thereon with the sealing surfaces 34, 35 of the reflector and cover glass sections in abutting engagement. The turret 10 then indexes the so assembled reflector and cover glass sections progressively through stations B, C and D where the glass sections, while rotating, are successively preheated by gas flames (not shown) and an inert gas, such as nitrogen, introduced through ports 32B, 32C, 32D and through the hollow spindle 25 and metal tube 27 into the space enclosed by the reflector and cover glass sections to flush the said space and protect the reflecting coating on the interior of the reflector section from the oxidizing effect of the atmosphere. During the movement of the head 11 through the said stations B, C and D, the secondary holder 26 supporting the assembled reflector and cover glass sections 12, 13 is continuously maintained in an elevated position, by the engagement of shoe 29 at the lower end of spindle 25 with the said elevated portion 33 of the cam track 30, to thereby position the reflector section 12 above the ring-shaped holder 14 and thus enable the preheating of said section by gas flames directed thereagainst.

Following the preheating of the assembled reflector and cover glass sections at stations B, C and D, the head 11 supporting the said glass sections is then successively indexed through stations E, F, G, H and J where the rims or peripheral flanges 16, 36 of the reflector and cover glass sections, respectively, are progressively heated and fused together by gas flames from pairs of diametrically opposite burners 37 which are moved down into operative relation after the head 11 is positioned at each of said stations. In the course of movement of the head 11 from station D to station E, the shoe 29 on the lower end of spindle 25 passes down an inclined portion 38 of cam track 30 to a depressed portion 39 thereof, causing the said spindle and the secondary holder 26 to be lowered just enough to permit the annular under surface 15 of the rim 16 of the reflector section 12 to rest on the ring-shaped main holder 14 so that the glass sections 12, 13 are supported and definitely positioned thereby. This positioning of the glass sections 12, 13 on the main holder 14 then continues throughout the movement of the head 11 through stations E to K, inclusive, the cam track 30 remaining at a depressed level throughout the said movement of the head.

In accordance with my invention, a vacuum is provided in the space enclosed by the assembled reflector and cover glass sections 12, 13 as soon as the sealing surfaces 34, 35 of both said sections become sufficiently plastic to fuse together, which condition first develops at station G. The vacuum pulls or draws the two glass sections tightly together at all points around the circumference of the glass sections and across their entire width or lateral extent, regardless of any warpage in the glass, thereby insuring the intimate contact of the sealing surfaces 34, 35 which is essential to a strong and tight seal between the glass parts. In particular, the pulling together of the reflector and cover glass sections 12, 13 by the vacuum therein insures the intimate contact of the innermost portions of the sealing surfaces, i. e., these portions adjacent the inner edges of the sealing surfaces. As a result, the presence of small wedge-shaped crevices or separations between the sealing surfaces at the innermost extremities thereof, which crevices would normally result in a weak and inferior seal between the glass sections, is obviated and the production of a strong and efficient seal assured in all cases.

The evacuation of the space within the assembled glass sections 12, 13 is first effected at station G, where the sealing surfaces 34, 35 of both said sections first become sufficiently plastic to be fused together, and then is continued at the next succeeding station H. A vacuum of from 1 to 3 inches of mercury has been found to be ample to accomplish the desired object of pulling or drawing the two glass sections together with sufficient force to thereby press the sealing surfaces 34, 35 into the intimate contact necessary for a strong seal therebetween. The evacuation of the space within the glass sections 12, 13 is accomplished through the metal tube 27, the hollow spindle 25 and the opening 31 in shoe 29, which opening aligns with the cam track ports 32G and 32H when the head 11 is successively positioned at stations G and H, the said ports 32G and 32H being connected by pipes 40 and 41 to a source of vacuum (not shown). The comparatively close fit between the parts of the spindle 25 and the glass assembly, when the head is positioned at stations G and H, provides an effective seal for producing the desired vacuum within the glass assembly.

After the heating and rolling of the rims 16, 36 of the glass sections and the evacuation of the glass assembly at stations G and H, the head is indexed to station J where the said rims are additionally heated to further soften the glass and complete the fusion and sealing together of the sealing surfaces 34, 35. Also, the positioning of the sealed glass assembly at station J provides a time interval for permitting the hollow interior of the glass assembly, which is again connected to a source of inert gas at said station through the port 32J, to become filled with such gas up to atmospheric pressure or nearly so.

In addition to the heating of the rims 16, 36 of the glass assembly at station J, the peripheral edges of the said rims are also engaged at said station by a pair of diametrically opposite rollers 42 (Fig. 4) which press against the said peripheral edges of the rims 16, 36 to thereby form or shape the same and further promote the fusion and sealing together of the sealing surfaces 34, 35. While the rolling of the edges of the rim is preferably performed at station J, this operation may be effected instead at either one of the two preceding stations G and H, or at any two or even all three of the stations G, H and J, by the provision at such stations of sets of rollers similar to the rollers 42.

From station J, the head 11 is then indexed to station K where the glass at the seal between the two glass sections 12, 13 is stretched and worked to partially relieve it of strains. The stretching of the seal is effected by a vertical displacement of the glass sections 12, 13 relative to and away from one another while the glass at the seal is still in a plastic condition from the heating operations at the preceding stations. The displacement is preferably accomplished by means of a blast of inert or reducing gas under pressure which is introduced into the sealed glass assembly through the metal tube 27, the hollow spindle 25 and the opening 31 in shoe 29, which opening aligns with the cam track port 32K when the head 11 is positioned at station K, the said port 32K being connected by pipe 43 to a source of inert or reducing gas. The inert gas entering the space within the sealed glass sections 12, 13 causes an upward movement of the cover glass 13 relative to the reflector section 12 uniformly around the annular extent of the seal therebetween so as to stretch and work the still plastic glass at the seal. The amount of upward movement or raising of the cover glass 13 relative to the reflector section 12 is preferably limited by a suitable stop 44 (Fig. 1), such as an inverted cup-shaped member, disposed above the cover glass 13 and rotatably supported from a stationary part of the machine.

In addition to the stretching of the seal at station K, the first of a series of annealing operations on the sealed glass sections also takes place at the said station, the annealing being effected by gas flames directed against the glass sections. The annealing of the sealed glass sections by similar gas flames then continues at stations L to P inclusive, the sealed glass sections, however, losing heat more rapidly than they gain so that they gradually drop in temperature until further annealing is not required when station Q is reached, which is the unloading station for the completed lamp envelopes.

The sealed envelope produced by the method according to the invention is stronger both to impact and internal pressures than envelopes produced by methods heretofore in use not incorporating the evacuation procedure employed in my improved sealing method. The strength of the seal produced in accordance with the invention has been increased approximately 60 per cent over that of seals produced by former methods. As a result, it has been possible to increase the index speed of the sealing machine by from 10 to 20 per cent while still obtaining a seal having a strength at least equal to that which was obtained by prior sealing methods, and without the necessity of employing additional sealing fires.

What I claim as new and desire to secure by Letters Patent of the United States is:

1. The method of sealing together two glass bodies to form a closed envelope which comprises assembling said glass bodies with their sealing surfaces in sealing relation to one another, heating said sealing surfaces to a plastic condition to fuse and seal said sealing surfaces together, and evacuating the envelope, while the glass at the seal is in a plastic condition, to a degree sufficient to pull the glass bodies together and compress the said sealing surfaces tightly together.

2. The method of sealing together two glass bodies to form a closed envelope which comprises assembling said glass bodies with their sealing surfaces in sealing relation to one another, heating said sealing surfaces to a plastic condition to fuse and seal said sealing surfaces together, evacuating the envelope to pull the glass bodies together and compress the said sealing surfaces tightly together, and then displacing said glass bodies relative to one another to stretch and work the glass at the seal.

3. The method of sealing together two glass bodies to form a closed envelope which comprises assembling said glass bodies with their sealing surfaces in sealing relation to one another, heating said sealing surfaces to a plastic condition to fuse and seal said sealing surfaces together, evacuating the envelope to pull the glass bodies together and compress the said sealing surfaces tightly together, rolling the outer peripheral edge of the seal to form and shape the glass thereat, and then displacing said glass bodies relative to one another to stretch and work the glass at the seal.

4. The method of sealing together two glass bodies to form a closed envelope which comprises assembling said glass bodies with their sealing surfaces in sealing relation to one another, heating said sealing surfaces to a plastic condition to fuse and seal said sealing surfaces together, evacuating the envelope to pull the glass bodies together and compress the said sealing surfaces tightly together, and then introducing a gaseous medium under pressure into the envelope to displace said bodies relative to one another so as to stretch and work the glass at the seal.

5. The method of sealing together two glass bodies to form a closed envelope which comprises assembling said glass bodies with their sealing surfaces in sealing relation to one another, heating said sealing surfaces to a plastic condition to fuse and seal said sealing surfaces together, evacuating the envelope to pull the glass bodies together and compress the said sealing surfaces tightly together, rolling the outer peripheral edge of the seal to form and shape the glass thereat, and then introducing a gaseous medium under pressure into the envelope to displace said bodies so as to stretch and work the glass at the seal.

6. Apparatus for sealing together two glass bodies to form a closed envelope comprising a holder for supporting said glass bodies in assembled relation with the sealing surfaces thereof in sealing relation to one another, heating means for fusing and sealing said sealing surfaces together, and means for connecting the interior of the envelope to a source of vacuum while the glass at the seal is in a plastic condition, the degree of vacuum being sufficient to compress the sealing surfaces tightly together.

7. Apparatus for sealing together two glass bodies to form a closed envelope comprising a holder for supporting said glass bodies in assembled relation with the sealing surfaces thereof in sealing relation to one another, heating means for fusing and sealing said sealing surfaces together, and means for successively connecting the interior of the envelope first to a vacuum and then to a source of gas under pressure, while the glass at the seal is in a plastic condition, the degree of vacuum being sufficient to compress the sealing surfaces tightly together and the degree of gas pressure being sufficient to stretch and work the glass at the seal.

8. Apparatus for sealing together two glass bodies to form a closed envelope comprising a holder for supporting said glass bodies in assembled relation with the sealing surfaces thereof in sealing relation to one another, heating means for fusing said sealing surfaces together, means for successively connecting the interior of the envelope first to a vacuum and then to a source of gas under pressure while the glass at the seal is in a plastic condition, the degree of vacuum being sufficient to compress the sealing surfaces tightly together and the degree of gas pressure being sufficient to stretch and work the glass at the seal, and seal reshaping means for pressing the sealed plastic edges of said glass bodies to a definite shape.

9. Apparatus for sealing together two glass bodies to form a closed envelope comprising an indexing carrier, a head mounted on said carrier for supporting said glass bodies in assembled relation with the sealing surfaces thereof in sealing relation to one another, heating means disposed adjacent the path of movement of said head for fusing the said sealing surfaces together, and means at one of the stations occupied by said head for effecting evacuation of the envelope while the glass at the seal is plastic, the degree of vacuum being sufficient to pull the glass bodies together and compress the said sealing surfaces tightly together.

10. Apparatus for sealing together two glass bodies to form a closed envelope comprising an indexing carrier, a head mounted on said carrier for supporting said glass bodies in assembled relation with the sealing surfaces thereof in sealing relation to one another, heating means disposed adjacent the path of movement of said head for fusing the said sealing surfaces together, means at one of the stations occupied by said head for effecting evacuation of the envelope while the glass at the seal is plastic, the degree of vacuum being sufficient to pull the glass bodies together and compress the said sealing surfaces tightly together, and means at another succeeding station for effecting introduction of gas under pressure into the envelope while the glass at the seal is still plastic to stretch and work the glass at the seal.

11. Apparatus for sealing together two glass bodies to form a closed envelope comprising an indexing carrier, a head mounted on said carrier for supporting said glass bodies in assembled relation with the sealing surfaces thereof in sealing relation to one another, heating means disposed adjacent the path of movement of said head for fusing the said sealing surfaces together, means at one of the stations occupied by said head for effecting evacuation of the envelope while the glass at the seal is plastic, the degree of vacuum being sufficient to pull the glass bodies together and compress the said sealing surfaces tightly together, means at another succeeding station for effecting introduction of gas under pressure into the envelope while the glass at the seal is still plastic to stretch and work the glass at the seal, and means at one of the stations occupied by said head for mechanically pressing the sealed plastic edges of said glass bodies to a definite shape.

FRANK C. PERKINS.